(12) United States Patent
Kostic et al.

(10) Patent No.: US 11,269,592 B2
(45) Date of Patent: Mar. 8, 2022

(54) SYSTEMS AND TECHNIQUES FOR PROCESSING KEYWORDS IN AUDIO DATA

(71) Applicant: QUALCOMM Incorporated, San Diego, CA (US)

(72) Inventors: Andrew Kostic, Woodbridge, CA (US); Prajakt Kulkarni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 16/794,553

(22) Filed: Feb. 19, 2020

(65) Prior Publication Data

US 2021/0255825 A1 Aug. 19, 2021

(51) Int. Cl.
| | |
|---|---|
| *G06F 3/16* | (2006.01) |
| *G10L 15/18* | (2013.01) |
| *G10L 15/02* | (2006.01) |
| *G10L 15/22* | (2006.01) |
| *G10L 15/08* | (2006.01) |

(52) U.S. Cl.
CPC .............. *G06F 3/167* (2013.01); *G10L 15/02* (2013.01); *G10L 15/18* (2013.01); *G10L 15/22* (2013.01); *G10L 2015/088* (2013.01); *G10L 2015/223* (2013.01)

(58) Field of Classification Search
CPC .............. G10L 15/22; G10L 2015/223; G10L 2015/088; G06F 3/167
See application file for complete search history.

(56) References Cited

U.S. PATENT DOCUMENTS

| | | | | |
|---|---|---|---|---|
| 6,163,508 | A * | 12/2000 | Kim | G11B 20/00007 |
| | | | | 369/25.01 |
| 10,871,943 | B1 * | 12/2020 | D'Amato | H04L 12/2809 |
| 2014/0281628 | A1 * | 9/2014 | Nigam | G06F 1/3206 |
| | | | | 713/323 |
| 2014/0337030 | A1 * | 11/2014 | Lee | G10L 15/22 |
| | | | | 704/251 |
| 2015/0039303 | A1 * | 2/2015 | Lesso | G10L 15/20 |
| | | | | 704/233 |
| 2015/0162002 | A1 * | 6/2015 | Liu | G10L 15/1822 |
| | | | | 704/235 |
| 2015/0379992 | A1 * | 12/2015 | Lee | G06F 1/3287 |
| | | | | 704/275 |

(Continued)

*Primary Examiner* — Samuel G Neway
(74) *Attorney, Agent, or Firm* — Qualcomm Incorporated

(57) ABSTRACT

Methods, systems, and devices for systems and techniques for processing keywords in audio data are described. In some devices configured with a virtual assistant, an audio processing component may support a command-first, keyword-second voice activation procedure. The audio processing component may receive audio data from a microphone and may compress a portion of the audio data and store the compressed audio data in a first buffer and may store a portion of the audio data that is uncompressed in a second buffer. The audio processing component may use the uncompressed audio data to detect the presence of a keyword and use the compressed audio data to identify a command associated with the keyword. Upon detection of the keyword, the audio processing component may decompress the compressed audio data and transmit the decompressed audio data and the uncompressed audio data to a main processor of the device.

29 Claims, 9 Drawing Sheets

(56) References Cited

U.S. PATENT DOCUMENTS

| | | | |
|---|---|---|---|
| 2016/0180837 A1* | 6/2016 | Gustavsson | G06F 3/167 |
| | | | 704/251 |
| 2018/0275959 A1* | 9/2018 | Sone | G10L 13/04 |
| 2019/0005953 A1* | 1/2019 | Bundalo | G10L 15/22 |
| 2019/0156818 A1* | 5/2019 | Piersol | G10L 15/08 |
| 2019/0279630 A1* | 9/2019 | Keren | G10L 15/08 |
| 2019/0371310 A1* | 12/2019 | Fox | G10L 15/08 |
| 2020/0005768 A1* | 1/2020 | Chae | G10L 15/22 |
| 2020/0365148 A1* | 11/2020 | Ji | G10L 15/22 |
| 2021/0255825 A1* | 8/2021 | Kostic | G10L 15/02 |

* cited by examiner

SYSTEMS AND TECHNIQUES FOR PROCESSING KEYWORDS IN AUDIO DATA

BACKGROUND

The following relates generally to audio processing and more specifically to systems and techniques for processing keywords in audio data.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

In some multimedia systems, an electronic device may execute a user-command via a virtual assistant application. In some cases, the electronic device may record a command (e.g., an audio command) via a microphone of the electronic device. The electronic device may identify a keyword that is associated with the command after identifying to begin processing of the command.

SUMMARY

The described techniques relate to improved methods, systems, devices, and apparatuses that support systems and techniques for processing keywords in audio data. Generally, the described techniques provide for greater user-flexibility in using a virtual assistant-enabled electronic device. For example, the described techniques may support a memory-efficient, command-first configuration that may enable a user to provide a command for a virtual assistant application on the electronic device in advance of a keyword associated with the command. In some examples, the electronic device may use one or more buffers (e.g., rolling or circular buffers) to store received audio data. In some implementations, the electronic device may use a first buffer to store sufficient audio data such that the first buffer may include a command and a second buffer to store audio data that may include a keyword associated with the command. The electronic device may continuously or repeatedly attempt to detect a keyword in the second buffer while maintaining the first buffer. In some examples, the electronic device may detect the keyword in the second buffer and may use the first buffer to determine the command associated with the keyword based on detecting the keyword. Accordingly, the electronic device may process the command and perform relevant operations or functions associated with executing the command.

A method for audio processing at a device is described. The method may include receiving, via a microphone, audio data, compressing a first portion of the audio data into compressed audio data, storing the compressed audio data in a first buffer configured to store the compressed audio data, storing a second portion of the audio data that is uncompressed audio data in a second buffer, identifying that a keyword is present in the second portion of the audio data stored in the second buffer, decompressing the compressed audio data stored in the first buffer into decompressed audio data based on identifying that the keyword is present, and transmitting the decompressed audio data and the second portion of the audio data that is uncompressed to a processor.

An apparatus for audio processing at a device is described. The apparatus may include a processor, memory in electronic communication with the processor, and instructions stored in the memory. The instructions may be executable by the processor to cause the apparatus to receive, via a microphone, audio data, compress a first portion of the audio data into compressed audio data, store the compressed audio data in a first buffer configured to store the compressed audio data, store a second portion of the audio data that is uncompressed audio data in a second buffer, identify that a keyword is present in the second portion of the audio data stored in the second buffer, decompress the compressed audio data stored in the first buffer into decompressed audio data based on identifying that the keyword is present, and transmit the decompressed audio data and the second portion of the audio data that is uncompressed to a processor.

Another apparatus for audio processing at a device is described. The apparatus may include means for receiving, via a microphone, audio data, means for compressing a first portion of the audio data into compressed audio data, means for storing the compressed audio data in a first buffer configured to store the compressed audio data, means for storing a second portion of the audio data that is uncompressed audio data in a second buffer, means for identifying that a keyword is present in the second portion of the audio data stored in the second buffer, means for decompressing the compressed audio data stored in the first buffer into decompressed audio data based on identifying that the keyword is present, and means for transmitting the decompressed audio data and the second portion of the audio data that is uncompressed to a processor.

A non-transitory computer-readable medium storing code for audio processing at a device is described. The code may include instructions executable by a processor to receive, via a microphone, audio data, compress a first portion of the audio data into compressed audio data, store the compressed audio data in a first buffer configured to store the compressed audio data, store a second portion of the audio data that is uncompressed audio data in a second buffer, identify that a keyword is present in the second portion of the audio data stored in the second buffer, decompress the compressed audio data stored in the first buffer into decompressed audio data based on identifying that the keyword is present, and transmit the decompressed audio data and the second portion of the audio data that is uncompressed to a processor.

In some examples of the method, apparatuses, and non-transitory computer-readable medium described herein, storing the second portion of the audio data in the second buffer further may include operations, features, means, or instructions for storing the second portion of the audio data in the second buffer concurrently with storing the compressed audio data in the first buffer based on receiving the audio data, the second buffer configured to store the uncompressed audio data.

In some examples of the method, apparatuses, and non-transitory computer-readable medium described herein, the first buffer stores a first copy of the audio data that may be compressed into the compressed audio data, and the second buffer stores a second copy of the audio data that may be uncompressed.

In some examples of the method, apparatuses, and non-transitory computer-readable medium described herein, the first buffer may be configured to store a first duration of the compressed audio data, and the second buffer may be configured to store a second duration of the audio data that may be uncompressed, the second duration being less than the first duration.

Some examples of the method, apparatuses, and non-transitory computer-readable medium described herein may further include operations, features, means, or instructions for retrieving the second portion of the audio data from the second buffer based on identifying that the keyword may be present, where sending the decompressed audio data further includes sending the second portion of the audio data retrieved from the second buffer.

In some examples of the method, apparatuses, and non-transitory computer-readable medium described herein, storing the second portion of the audio data in the second buffer further may include operations, features, means, or instructions for storing the second portion of the audio data in the second buffer before compressing the first portion of the audio data, where the second buffer may be configured to store the uncompressed audio data.

Some examples of the method, apparatuses, and non-transitory computer-readable medium described herein may further include operations, features, means, or instructions for identifying that the second portion of the audio data may have been stored in the second buffer for a first duration that satisfies a threshold, where compressing the first portion of the audio data further includes compressing the second portion of the audio data that may have been stored in the second buffer for the first duration that satisfies the threshold.

Some examples of the method, apparatuses, and non-transitory computer-readable medium described herein may further include operations, features, means, or instructions for retrieving the second portion of the audio data from the second buffer, and retrieving the compressed audio data from the first buffer, where decompressing the compressed audio data may be based on retrieving the compressed audio data from the first buffer, where transmitting the decompressed audio data and the second portion of the audio data may be based on retrieving the second portion of the audio data and the compressed audio data.

Some examples of the method, apparatuses, and non-transitory computer-readable medium described herein may further include operations, features, means, or instructions for sending, to the processor, an indication that the keyword may be present in the audio data, where the processor may be configured to identify an audio command associated with the keyword using the decompressed audio data.

Some examples of the method, apparatuses, and non-transitory computer-readable medium described herein may further include operations, features, means, or instructions for aligning the decompressed audio data stored in the first buffer with the second portion of the audio data stored in the second buffer, where transmitting the decompressed audio data and the second portion of the audio data may be based on aligning the decompressed audio data with the second portion of the audio data used to determine whether the keyword may be present.

Some examples of the method, apparatuses, and non-transitory computer-readable medium described herein may further include operations, features, means, or instructions for identifying that a third portion of the compressed audio data may have been stored in the first buffer for a first duration that satisfies a threshold, and evicting the third portion of the compressed audio data from the first buffer based on identifying that the third portion may have been stored for the first duration that satisfies the threshold.

Some examples of the method, apparatuses, and non-transitory computer-readable medium described herein may further include operations, features, means, or instructions for processing the second portion of the audio data that may be uncompressed based on storing the compressed audio data in the first buffer, where identifying the keyword may be based on processing the second portion of the audio data that may be uncompressed.

In some examples of the method, apparatuses, and non-transitory computer-readable medium described herein, the first buffer includes a circular buffer having a fixed size and configured to store a continuous data stream.

An apparatus is described. The apparatus may include a processor, a microphone configured to detect audio data, an audio processing component coupled with the microphone and the processor, the audio processing component including, and a second buffer configured to store uncompressed audio data for a second duration, where the audio processing component is configured to identify whether a keyword is present in the audio data detected by the microphone using the uncompressed audio data stored in the second buffer.

Some examples of the apparatus may include a compression component coupled with the first buffer and configured to compress a first portion of the audio data, where the first buffer may be configured to store the compressed audio data.

Some examples may further include identifying that a second portion of the audio data that includes the uncompressed audio data may be stored in the second buffer for the second duration, and compress the second portion of the audio data that may have been stored in the second buffer for the second duration to generate the compressed audio data.

In some examples, the audio processing component may be configured to store a first portion of the audio data that was compressed into the first buffer based on identifying that the second portion of the audio data may have been stored in the second buffer for the second duration.

Some examples may further include identifying that a first portion of the audio data that includes the compressed audio data may have been stored in the first buffer for the first duration, and evict the first portion of the audio data from the first buffer based on identifying that the first portion of the audio data may have been stored in the first buffer for the first duration.

Some examples of the apparatus may include a decompression component coupled with the first buffer and configured to decompress the compressed audio data stored in the first buffer, where decompressing the compressed audio data stored in the first buffer may be based on identifying that the keyword may be present in the uncompressed audio data stored in the second buffer.

Some examples of the apparatus may include a communication component configured to send the decompressed audio data to the processor and the uncompressed audio data stored in the second buffer to the processor, where sending the decompressed audio data and the uncompressed audio data to the processor may be based on the audio processing component identifying that the keyword may be present in the uncompressed audio data stored in the second buffer.

In some examples, the communication component may be further configured to send an indication that the keyword may be present in the uncompressed audio data sent to the processor.

Some examples may further include identifying a command included in the decompressed audio data and associated with the keyword identified in the uncompressed audio data, and execute the command based on identifying the command.

In some examples, the first buffer may be configured to store the compressed audio data and the second buffer may be configured to store the uncompressed audio data concurrently.

In some examples, the second duration that the second buffer stores the uncompressed audio data may be shorter than the first duration that the first buffer stores the compressed audio data.

DETAILED DESCRIPTION

Figure 1:
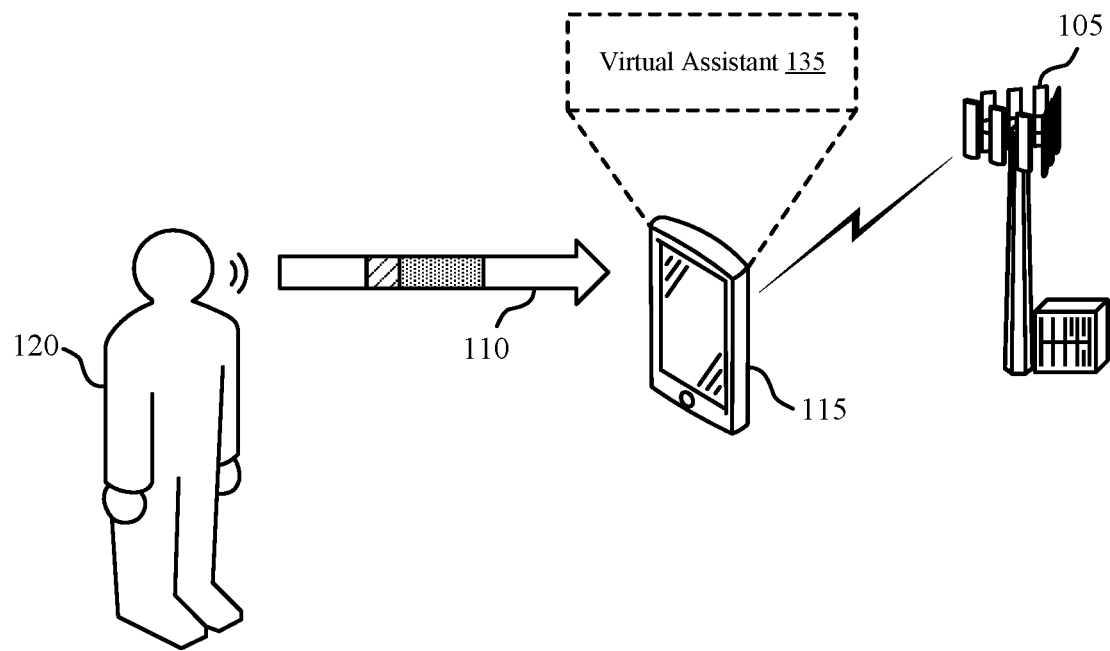
FIG. 1 illustrates an example of an environment for audio processing that supports systems and techniques for processing keywords in audio data in accordance with aspects of the present disclosure.

Some electronic devices may be configured with a virtual assistant that may feature audio detection capabilities associated with detecting and executing audio commands. For example, an electronic device configured with such a virtual assistant may continuously monitor for a keyword in an audio data stream and, upon detection of the keyword, may store a subsequent amount of audio data that may include a command (e.g., a user-command). The electronic device may process the audio data including the command and perform one or more operations or functions associated with executing the command. For instance, in the case of some specific implementations, a user may say "Alexa, call Mom." The electronic device may detect the keyword "Alexa" and, accordingly, may begin storing a subsequent amount of audio data that may include the command "call Mom." In some cases, the electronic device may execute the command (e.g., calling Mom). The electronic device may feature similar functionalities for other virtual assistant applications and may detect keywords corresponding to the virtual assistant application configured with the electronic device (e.g., the electronic device may detect also "Okay, Google," "Sin," or other keywords associated with other virtual assistants). In some cases, it may be more natural for a user to say a command prior to a keyword. For example, it may be unnatural in some languages to interact with another person (e.g., or a virtual assistant) using the other person's name first. For instance, it may be more natural for a user to say, "Call Mom, Alexa." In such cases, the current keyword-first operational structure may use some user training.

In some cases, however, a command-first operational structure may result in an increase in the amount of audio data that the electronic device may store (e.g., buffer) while attempting to detect a keyword. For example, because the electronic device may not know a command is present until after it has been received (e.g., after the electronic device detects the keyword following the command), the electronic device may buffer a large amount of audio data at all times in anticipation that the audio data stored in the buffer may include a command. Such large amounts of data may increase an amount of memory used by the buffer and may increase the die size of an audio processing component of the electronic device. In some cases, the electronic device may compress the buffered audio data to reduce the amount of memory (e.g., die area) used to store the buffered audio data. Compressing the audio data may cause some information in the audio data to be lost (e.g., the compression techniques may be lossy), which may affect the detectability of the keyword. In some cases, the electronic device (e.g., the virtual assistant) may be trained using an uncompressed version of the keyword and may be unable to detect a compressed version of the keyword. Moreover, the time spent training an electronic device to be capable of detecting a keyword may be significant, such that training the electronic device to detect both an uncompressed version of the keyword and a compressed version of the keyword may be impractical.

In some implementations of the present disclosure, an electronic device may efficiently process audio commands that occur before a keyword is detected. The electronic device may include an audio processing component including one or more buffers for storing received audio data. In some specific examples, the audio processing component may include two buffers, a first buffer for storing a portion of the received audio data that is compressed and a second buffer for storing a portion of the received audio data that is uncompressed. The first buffer may be designed to include a larger portion of the received audio data and may be used to store audio data that potentially includes a command. The second buffer may be designed to include a smaller portion of the most recently received audio data that may potentially include a keyword.

In some examples, the audio processing component may detect the keyword in the second buffer (e.g., in the uncompressed portion of the audio data that is most recently received). Upon detection, the audio processing component may decompress the portion of the audio data stored in the first buffer, which may presently include a command based on detecting the keyword in the second buffer, and may transmit the decompressed audio data and the audio data in the second buffer (e.g., the audio data including the keyword that was never compressed) to a processor of the electronic device. Accordingly, the processor of the electronic device may process the command and perform operations or functions associated with executing the command.

Aspects of the disclosure are initially described in an environment for audio processing. Aspects of the disclosure are additionally illustrated by and described with reference to processing procedures, buffer configurations, and process flows. Aspects of the disclosure are further illustrated by and described with reference to apparatus diagrams, system diagrams, and flowcharts that relate to systems and techniques for processing keywords in audio data.

FIG. 1 illustrates an example of a communications system 100 that supports systems and techniques for processing keywords in audio data in accordance with aspects of the present disclosure. In some examples, communications system 100 includes an electronic device 115 and a user 120. In some cases, the electronic device 115 may be a part of a communications network and may communicate with a core network 105 via a wired or wireless connection.

In some aspects, the electronic device 115 may be configured with a virtual assistant 135. In some cases, the electronic device 115 may be a cell phone, a computer, a laptop, a server, a smart speaker, a smart home device, or any other device capable of implementing a virtual assistant 135. The virtual assistant 135 may perform a number of operations or functions for a user 120 based on a user 120 input. In some cases, the virtual assistant 135 may operate based on audio data 110 provided by the user 120. The audio data 110 may include speech or voice signals from either the user 120 or any other number of users or devices capable of generating audio data 110. In some examples, the user 120 may provide a command 125 in the audio data 110 that the virtual assistant 135, or the electronic device 115 on behalf of the virtual assistant 135, may execute.

In some cases, the user 120 may provide a keyword 130 prior to a command 125 to trigger the virtual assistant 135 to record the subsequent command 125 from the user 120. For instance, the user 120 may say, "Alexa, what is the weather?" In such examples, the virtual assistant 135, via a microphone or an audio processing component of the electronic device 115, or both, may detect the keyword 130 (e.g., "Alexa") and begin recording audio data 110, including the command 125 (e.g., "what is the weather"). Accordingly, the audio processing component of the electronic device 115 may perform one or more operations or functions associated with executing the command 125 for the user 120. In some cases, the audio processing component may identify the portion of audio data 110 that includes the command 125 and may pass (e.g., transmit, send, or provide) the audio data 110 including the command 125 to a processor (e.g., a primary processor) of the electronic device 115. As such, the processor of the electronic device 115 may perform an operation associated with the command, such as open a web page, perform a calculation, and the like. Additionally or alternatively, the electronic device 115 may perform a function associated with the command, which may include responding (e.g., via voice or speech signals generated by the processor or another component of the electronic device 115) to the user 120 by acknowledging or answering the command 125, or both.

In some cases, it may be more natural for the user 120 to provide the command 125 prior to the keyword 130. For example, it may be more natural for the user 120 to say, "What is the weather, Alexa?" Due to the possibility of receiving the keyword 130 after the command 125, the electronic device 115 (on behalf of the virtual assistant 135) may store an amount of audio data 110 in anticipation that the stored amount of audio data 110 includes a command 125. In some cases, storing an amount of audio data 110 that may include a command 125 (e.g., 8-10 seconds of audio data in some cases) may use a large amount of local memory of the electronic device 115. Storing such large amounts of audio data may use a buffer with bigger memory, which may use a bigger die area. In many electronic devices, space inside of the device is limited, so the increase in the die area size of the buffer may be prohibitive.

In some implementations of the present disclosure, the electronic device 115 may store audio data 110 in two buffers. A first buffer may be configured to store audio data 110 that may include the command 125 and a second buffer may be configured to store audio data 110 that may include the keyword 130. In some examples, the first buffer may be larger than the second buffer (e.g., the command 125 may be associated with more audio data 110 than the keyword 130). Accordingly, the electronic device 115 may compress the audio data 110 in the first buffer to reduce the amount of memory the electronic device 115 may use for storing the audio data 110 in the first buffer. In some examples, the audio data stored in the second buffer may be uncompressed (e.g., may be left uncompressed) and may include a most recently received amount of audio data 110. In this manner, the electronic device 115 may continuously or repeatedly attempt to detect a keyword 130 (e.g., an uncompressed keyword 130) in the second buffer. Upon detection of the keyword 130 in the second buffer, the electronic device 115 may output the contents of the first buffer to a processor. In some cases, the contents of the first buffer may be decompressed before they are output to the processor. For example, the electronic device 115, based on detecting the keyword 130 in the second buffer, may determine that the compressed audio data 110 stored in the first buffer presently includes the command 125 and may preserve the audio data 110 stored in the first buffer by outputting or freezing the first buffer.

In some implementations, an audio processing component of the electronic device 115 may detect the keyword 130 in the second buffer and output the audio data 110 stored in the first buffer based on detecting the keyword 130. In some examples, the audio processing component may decompress the audio data 110 stored in the first buffer (e.g., the audio data 110 that may include the command 125) and may output or pass the decompressed audio data 110 that may include the command 125 and the uncompressed audio data 110 that may include the keyword 130 to a processor of the electronic device. The processor may detect that the decompressed audio data 110 includes the command 125 and may perform one or more operations or functions associated with executing the command 125. The operations between the audio processing component and the processor are discussed in additional detail with reference to FIG. 2.

Figure 2:
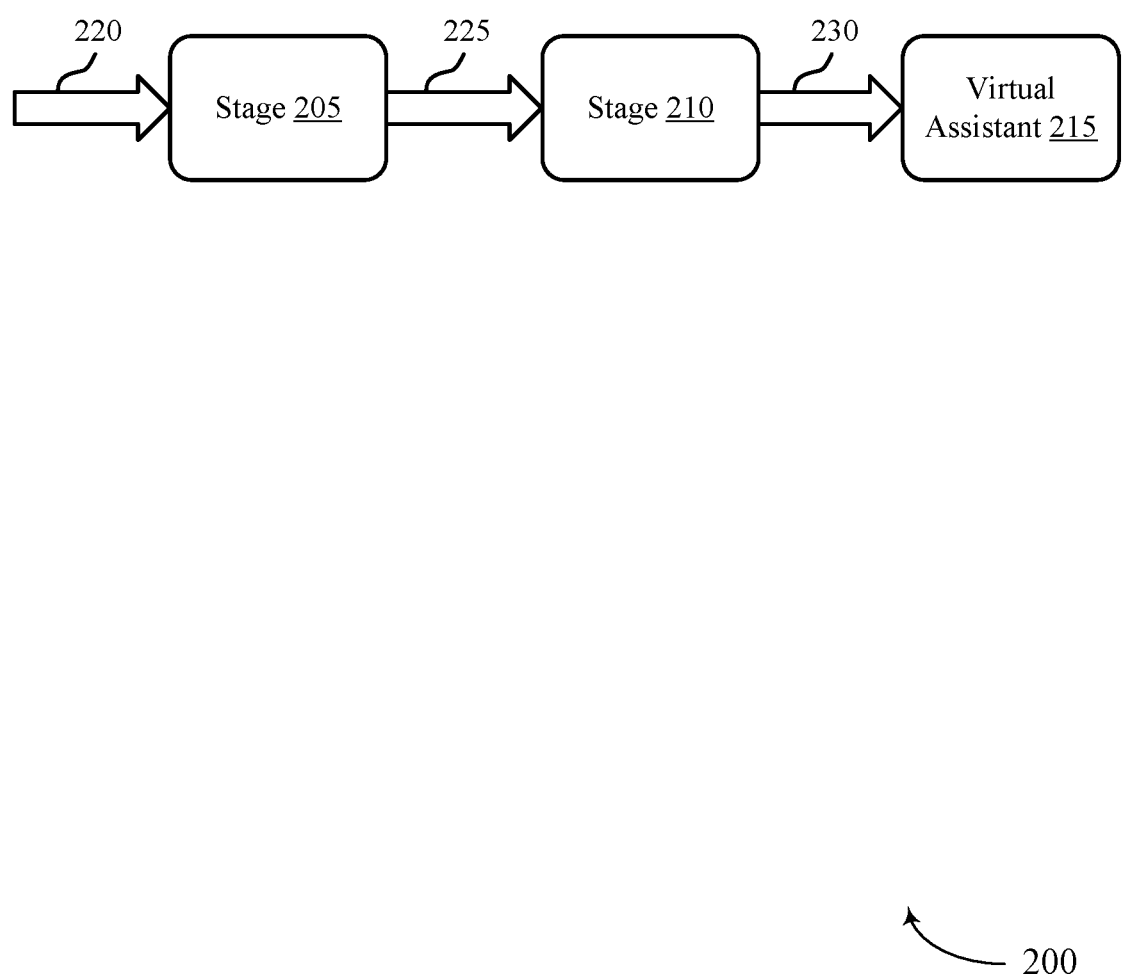
FIG. 2 illustrates an example of a processing procedure that supports systems and techniques for processing keywords in audio data in accordance with aspects of the present disclosure.

FIG. 2 illustrates an example of a processing procedure 200 that supports systems and techniques for processing keywords in audio data in accordance with aspects of the present disclosure. In some examples, the processing procedure 200 may implement aspects of communications system 100. For example, the processing procedure 200 may implement the processing operations of an electronic device, such as an electronic device 115, associated with performing voice activated commands. In some examples, the processing procedure 200 may illustrate how an audio processing component (e.g., an audio chip) of the electronic device operates together with a processor (e.g., a primary processor) of the electronic device to execute commands associated with voice or speech signals from a user, such as a user 120 as described with reference to FIG. 1. In some cases, the processing procedure 200 may include a stage 205 (e.g., a processing stage of the electronic device associated with the operations of the audio processing component), a stage 210 (e.g., a processing stage of the electronic device associated with the operations of the processor), and a virtual assistant 215, which may be an example of a virtual assistant 135 as described with reference to FIG. 1.

In some examples, the electronic device may receive audio data 220. The audio data 220 may be an example of the audio data 110 as described with reference to FIG. 1. The audio data 220 may be an example of modulated sound waves that propagate through a medium by way of vibrations or disturbances of the particles of the medium that the sound wave travels through. In some cases, the modulated sound waves may be longitudinal mechanical waves with areas of compression and areas of expansion. The electronic device may receive the audio data 220 from a number of users or devices. In some aspects, the electronic device may receive the audio data 220 via one or more microphones of the electronic device. In some cases, the audio data 220 may include a keyword associated with the virtual assistant 215 and corresponding command that the electronic device may process and execute. In some examples, the audio data 220 may include the command prior to the keyword (e.g., based on the user input).

In some implementations, at stage 205, the audio processing component of the electronic device may store the audio data 220 in a first buffer that may include a first portion of the audio input 220 and a second buffer may include a second portion of the audio input 220. In some examples, the first buffer may store audio data 220 associated with a command and the second buffer may store audio data 220 associated with a keyword. As described herein, the first buffer may be compressed to reduce the memory cost of storing the first portion of the audio data 220 and the second buffer may be left uncompressed so that the detectability of the keyword is not affected. The audio processing component may store the audio data 220 in a local memory of the electronic device, such as an L2 cache memory or a tightly coupled memory (TCM) associated with the audio processing component.

In some cases, the audio processing component may detect that a keyword is present in the second portion of the audio data 220 stored in the second buffer and may save a copy of the first portion of the audio data 220 that is stored in the first buffer at the time the keyword was detected in the second buffer. Accordingly, the audio processing component may decompress the first portion of the audio data 220 and may align the decompressed first portion of the audio data 220 with the uncompressed second portion of the audio data 220 (e.g., may align the two portions of the audio data 220 in time). In some cases, the audio processing component may employ less computationally intensive algorithms (e.g., simpler algorithms) than the processor. Similarly, the audio processing component may employ smaller model sizes (e.g., associated with detecting the keyword). As such, the audio processing component may pass the portions of the audio data 220 to the processor for additional processing. In some examples, the audio processing component may additionally send an indication that the keyword was detected to the processor. The audio processing component may pass aligned portions of the audio data 220 to the processor of the electronic device as audio data 225.

At stage 210, the processor may receive the audio data 225 and may process the audio data 225 to determine if the keyword was accurately detected and if a command is present (e.g., present in the first portion of the audio data 220). The processor may be associated with a non-island use case (e.g., the processor may operate in communication with other components of the electronic device) and, likewise, may employ algorithms and models based on double data rate (DDR) or dynamic random-access memory (DRAM) memory. This may enable the processor to use more complex algorithms (e.g., 200 MHz or greater in some cases) and larger model sizes (e.g., about 1 megabyte (MB)) than the audio processing component. For example, the processor may support neural network architectures, such as convolutional neural network (CNN), recurrent neural network (RNN), and long short-term memory (LSTM) architectures. In some cases, the processor may feature fast wake and sleep timelines and high accuracy detection.

In some examples, the processor may detect the keyword in the audio data 225 and detect a command in the audio data 225. In some implementations, the processor may determine whether the command is located before or after the keyword. The processor may pass an indication 230 including the detected keyword and command (which may be the audio data 225 including the keyword and the command) to the virtual assistant 215. The virtual assistant 215, or the electronic device on behalf of the virtual assistant, may further process the command and perform one or more operations or functions associated with executing the command.

Figure 3A:
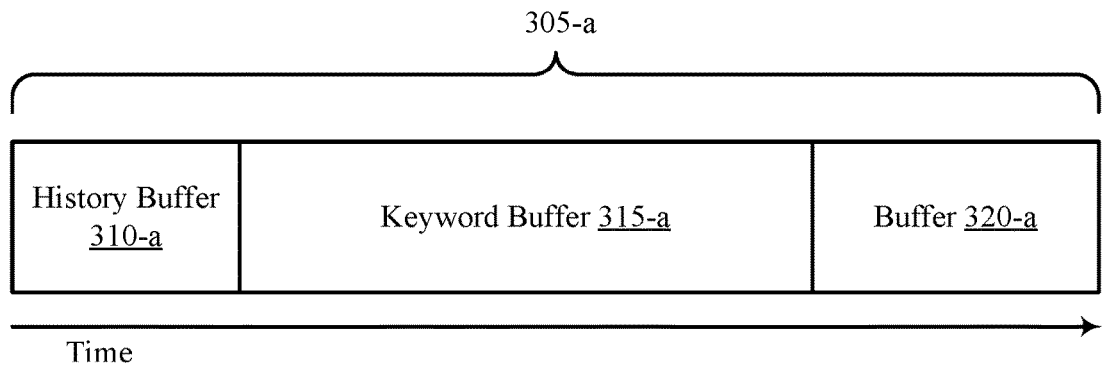
FIGS. 3A and 3B illustrate examples of buffer configurations that support systems and techniques for processing keywords in audio data in accordance with aspects of the present disclosure.
Figure 3B:
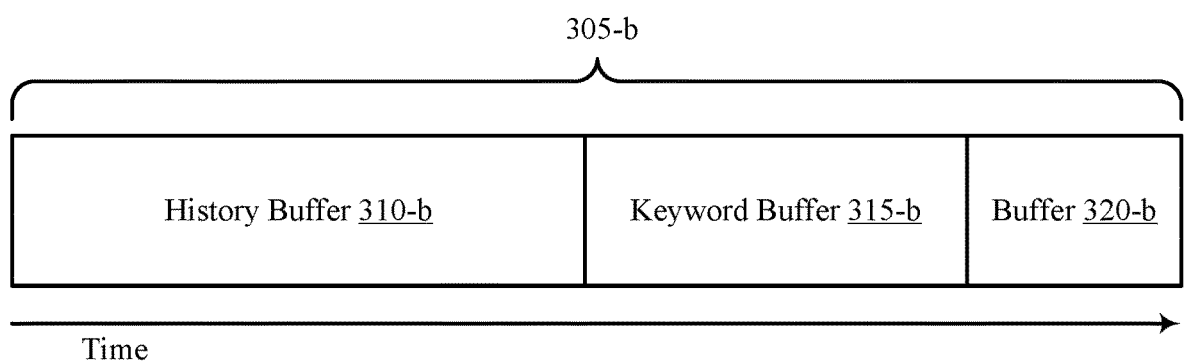

FIGS. 3A and 3B illustrate an example of buffer configurations 300 and 301 that support systems and techniques for processing keywords in audio data in accordance with aspects of the present disclosure. In some examples, the buffer configurations 300 and 301 may implement aspects of communications system 100. The buffer configurations 300 and 301 may illustrate example implementations for efficiently storing audio data in command-first, keyword-second voice activation procedures. For example, an electronic device, such as an electronic device 115 as described with reference to FIG. 1, may use buffer configuration 300 or 301, or both, to store audio data including a command and audio data including a keyword.

In some cases, an electronic device may be configured with a virtual assistant to enhance a user experience or interface with the electronic device. For example, some virtual assistants may support voice activation or voice commands, or both, such that the electronic device may perform one or more operations or functions for a user based on voice or speech signals received from the user. In some cases, the electronic device may continuously capture and store audio data via one or microphones of the electronic device and may store the audio data in one or more buffers of an audio processing component of the electronic device. In some cases, the amount of audio data that the audio processing component may store may be based on the size of a local memory of the electronic device (e.g., a die size). For instance, the electronic device may be manufactured with a local memory and the size of the one or more buffers may be based on the size of the local memory or, in some specific cases, the size of the local memory that is allocated to audio processing functions of the audio processing component.

As such, an electronic device may attempt to avoid storing large amounts of audio data 305 and may support functions that enable the electronic device to store small amounts of audio data 305. For instance, an electronic device may support a keyword-first, command-second voice activation structure where only storing enough audio data to include the keyword may be sufficient. In such cases, the electronic device, supporting the audio-based virtual assistant, may employ a buffer configuration 300 associated with a low-power, always-on memory that is sized based on an estimated length of the keyword in the time-domain (e.g., about 2 seconds), which may be associated with a keyword buffer 315-a. Additionally, in some cases, the memory may be sized based on one or more additional buffers, including a history buffer 310-*a* and a buffer 320-*a*. In some aspects, the history buffer 310-*a* (e.g., about 200 ms) and the buffer 320-*a* (e.g., about 300 ms) may include shorter spans of audio data 305-*a* and, in some cases, the overall size of the memory to store the audio data 305-*a* may be approximately 74 kilobytes (KB). The history buffer 310-*a*, the keyword buffer 315-*a*, and the buffer 320-*a* may be separate buffers or, alternatively, may refer to different portions of the same buffer (e.g., an approximately 2.5 s buffer).

In some cases, the electronic device may continuously update the audio data 305-*a* stored by the one or more buffers such that the amount (or size) of audio data 305-*a* stored in the buffer configuration 300 is constant, or nearly constant, over time. The audio processing component of the electronic device may continuously attempt to detect a keyword in the keyword buffer 315-*a*. Upon detection of the keyword, the audio processing component may transmit the history buffer 310-*a* and the keyword buffer 315-*a* to a next processing stage (e.g., a processing stage associated with operations of the processor of the electronic device, such as stage 210 as described with reference to FIG. 2). In some cases, the buffer 320-*a* may include a beginning of a command. The processor may identify and store a command that follows the keyword buffer 315-*a* and may perform one or more operations or functions associated with executing the command. In some cases, the processor may use DDR and DRAM and, likewise, may have access to more free memory than the audio processing component. This may result in less concern over memory costs when the processor is storing the audio data including the command.

In some cases, however, it may be more natural for a user to say the command before the keyword, which may result in storing the audio data including the command in local memory of the audio processing component because the command will have already been received by the time the keyword is identified. Thus, the processor may be unable to capture the audio data including the command because the processor may not turn on or may perform other processing tasks until receiving an indication that the keyword is received. Moreover, configuring or instructing a main processor of an electronic device to constantly listen for a command may result in severe processing inefficiencies and high power costs.

In some languages or in some use cases a user may prefer to provide a command prior to a keyword. For example, it may be more natural for the user to say, "What's the weather, Alexa?" than "Alexa, what's the weather?" Based on storing the audio data including the command in local memory, a command-first, keyword-second voice activation procedure may be associated with high memory costs. For example, storing a sufficient amount of audio data 305-*b* such that the stored audio data 305-*b* includes a command may use a large amount of local memory. In some examples, the audio processing component may configure a history buffer 310-*b* to store audio data that may include a command and may configure the history buffer 310-*b* to be approximately 8 seconds to 10 seconds long to fully capture most commands (i.e., approximately four times longer than a keyword buffer 315). For example, the history buffer 310-*b* may store 10 seconds of audio data and may use approximately 320 KB of local memory, while all of audio data 305-*a* (e.g., the total amount of locally stored audio data in a keyword-first implementation) may use approximately 74 KB of memory. Further, in the command-first implementation, the sizes of the keyword buffer 315-*b* (e.g., about 2 seconds) and the buffer 320-*b* (e.g., about 300 ms) in buffer configuration 301 may be similar to the sizes of the keyword buffer 315-*a* and the buffer 320-*a* in buffer configuration 300. In some cases, the audio data 305-*b* that the electronic device supporting a command-first implementation may store in the local memory may be approximately 394 KB. Thus, a command-first implementation may use significantly more local memory than a keyword-first implementation.

In some implementations of the present disclosure, the electronic device, or the audio processing component of the electronic device, may configure the history buffer 310-*b* and the keyword buffer 315-*b* in a way to reduce the memory cost associated with command-first use-cases with a virtual assistant. For example, the audio processing component may continuously store (e.g., capture) audio data 305-*b* received via one or more microphones of the electronic device and may store the audio data 305-*b* in the history buffer 310-*b*, the keyword buffer 315-*b*, and, in some cases, the buffer 320-*b*.

In some examples, the audio processing component may use the buffer 320-*b* to provide one or more processing units (e.g., processing units associated with processing audio data) of the electronic device sufficient time to turn on or wake up. In some cases, the audio processing component may activate the buffer 320-*b* after detecting the keyword. In some aspects, the audio processing component may use the buffer 320-*b* to store the command in the case that the command follows the keyword buffer 315-*b* (e.g., the buffer 320-*b* may relate to the first buffer as described with reference to FIGS. 1 and 2). In some other aspects, the audio processing component may use the buffer 320-*b* to capture a portion or all of the keyword (e.g., the buffer 320-*b* may relate to the second buffer as described with reference to FIGS. 1 and 2).

In some examples, the audio processing component may store an amount of audio data (e.g., a most recent 10 seconds of received audio data) between the history buffer 310-*b* and the keyword buffer 315-*b*. In some aspects, the audio processing component may store a first portion of the audio data in the history buffer 310-*b* and a second portion of the audio data in the keyword buffer 315-*b*. In some specific examples, the first portion of the audio data may correspond to a portion of the audio data that was received first (e.g., an oldest or a longest-stored portion of audio data) and the second portion of the audio data may correspond to a portion of the audio data that was received second (e.g., a most recently received portion of audio data). For example, in the case that the history buffer 310-*b* and the keyword buffer 315-*b* store a most recently received 10 seconds of audio data, the history buffer 310-*b* may store an initially received or preceding portion of the audio data (e.g., the first 8 seconds) and the keyword buffer 315-*b* may store a newest or most recently received portion of the audio data (e.g., the last 2 seconds). In some other examples, the history buffer 310-*b* may store all of the most recently received 10 seconds of audio data and the keyword buffer 315-*b* may store the newest or most recently received portion of the audio data (e.g., the last 2 seconds). In such examples, the history buffer 310-*b* and the keyword buffer 315-*b* may store overlapping portions of audio data. In some other examples, the history buffer 310-*b* and the keyword buffer 315-*b* may refer to different portions of a single buffer.

The audio processing component may continuously update the audio data stored in the keyword buffer 315-*b*, such that if the audio processing component determines that a portion of the audio data has been stored in the keyword buffer 315-*b* for longer than a threshold amount of time (e.g., longer than 2 seconds), the audio processing component may transfer the portion of the audio data from the keyword buffer 315-*b* to the history buffer 310-*b*. Similarly, if the audio processing component determines that a portion of the audio data has been stored in the history buffer 310-*b* for longer than a threshold amount of time (e.g., longer than 8 seconds), the audio processing component may evict the portion of the audio data from the history buffer 310-*b* (e.g., the audio processing component may no longer store the evicted portion of the audio data). In this manner, the audio processing component may maintain a constant, or nearly constant, amount of audio data in the history buffer 310-*b* and the keyword buffer 315-*b* over time.

In some implementations, the audio processing component may implement a compression scheme based on the buffer configuration 301. For example, the audio processing component may compress the audio data stored in one or more audio buffers. In some implementations, the audio processing component may compress audio data in the history buffer 310-*b*, which may reduce the amount of local memory that the audio processing component may use to store the audio data in the history buffer 310-*b*. The audio processing component may implement a number of different compression schemes, some examples of which are described in detail with reference to FIG. 6.

In some examples, the audio processing component may refrain from compressing the audio data stored in the keyword buffer 315-*b*. For instance, the audio processing component may attempt to detect the keyword in the keyword buffer 315-*b* and compressing the keyword buffer 315-*b* may impact the performance of keyword detection algorithms. In some cases, keyword models may be trained based on uncompressed (e.g., raw) data and, likewise, it may be difficult for current keyword models to detect a keyword in compressed audio data. Current keyword models may experience additional difficulty in the case that the electronic device employs lossy compression schemes. For instance, some compression schemes may be associated with lossy characteristics, which may result in the loss of some audio data information, and current keyword models may be trained in the absence of any lost audio data information. Further, training a new keyword model may take significant time and energy. Accordingly, the audio data in the keyword buffer 315-*b* may be left uncompressed such that the audio processing component may implement current keyword models and avoid re-training keyword models.

As such, the audio processing component, supporting a command-first implementation with a virtual assistant using a buffer configuration 301, may reduce the memory (e.g., local memory) costs associated with command-first voice activation. Additionally, in some examples, upon detection of a keyword in the keyword buffer 315-*b*, the audio processing component may decompress the audio data stored in the history buffer 310-*b* and align the audio data stored in the history buffer 310-*b* with the audio data stored in the keyword buffer 315-*b*. The audio processing component may pass the decompressed audio data (e.g., the audio data stored in the history buffer 310-*b* at the time of keyword detection) and the uncompressed audio data (e.g., the audio data stored in the keyword buffer 315-*b* at the time of keyword detection) to a processor (e.g., a main or a primary processor) of the electronic device. Based on decompressing the audio data stored in the history buffer 310-*b* and providing the uncompressed audio data stored in the keyword buffer 315-*b* to the processor, the processor may be unaware that decompression was used, which may result in minimal or no impact on the performance of the processor associated with keyword and command detection. In some examples, based on implementing the techniques described herein, the speech recognition software at the processor may experience increased robustness to lower quality audio data (e.g., lower quality audio recordings). As such, the described techniques may simultaneously reduce the memory costs associated with command-first implementations and maintain robust and accurate performance of the virtual assistant.

Figure 4:
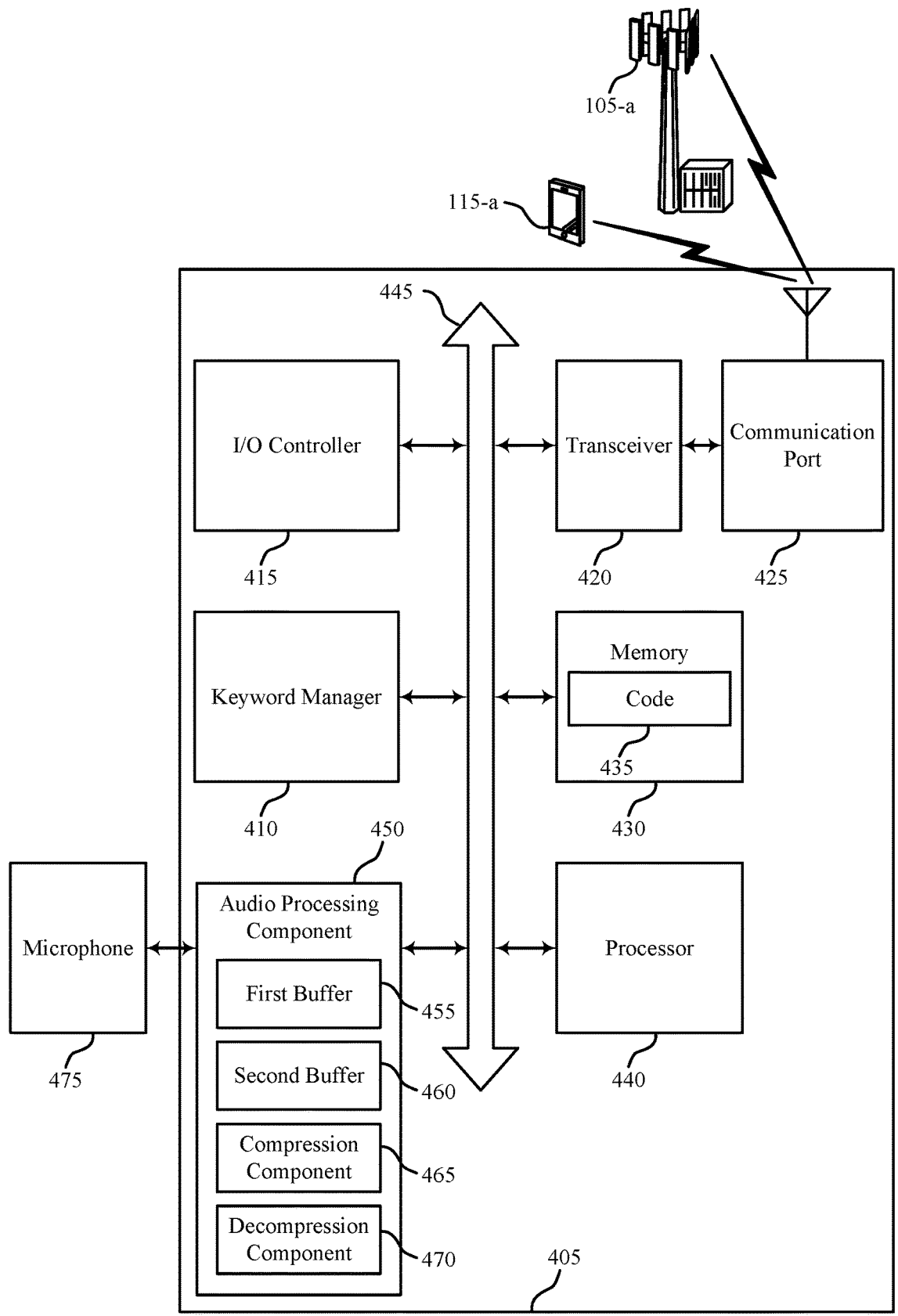
FIG. 4 illustrates an example of diagram of a system including a device that supports systems and techniques for processing keywords in audio data in accordance with aspects of the present disclosure.

FIG. 4 shows a diagram of a system 400 including an electronic device 405 that supports systems and techniques for processing keywords in audio data in accordance with aspects of the present disclosure. The electronic device 405 may be an example of or include the components of the electronic device as described herein, such the electronic device 115 as described with reference to FIG. 1. The electronic device 405 may include components for bi-directional voice and data communications including components for transmitting and receiving communications, including a keyword manager 410, an I/O controller 415, a transceiver 420, a communication port 425, memory 430, a processor 440, and an audio processing component 450. In some implementations, the audio processing component 450 may include a first buffer 455, a second buffer 460, a compression component 465, and a decompression component 470. In some examples, the audio processing component 450 may be coupled with or otherwise receive data (e.g., audio data) from a microphone 475. The microphone 475 may be part of the electronic device 405 or in electronic communication with the electronic device 405 via a wired or a wireless connection. These components may be in electronic communication via one or more buses (e.g., bus 445).

The electronic device 405 may include a processor 440, a microphone 475 configured to detect audio data, and an audio processing component 450 coupled with the microphone 475 and the processor 440. The audio processing component 450 may include a first buffer 455 configured to store compressed audio data for a first duration, a second buffer 460 configured to store uncompressed audio data for a second duration, where the audio processing component 450 may be configured to identify whether a keyword is present in the audio data detected by the microphone 475 using the uncompressed audio data stored in the second buffer 460.

In some examples, the keyword manager 410 may identify whether a keyword is present in the audio data together with or instead of the audio processing component 450. In some cases, the keyword manager 410 may store one or more keyword models and the electronic device 405, via the audio processing component 450 or the processor 440, or both, may implement the one or more keyword models to detect a keyword.

The I/O controller 415 may manage input and output signals for the electronic device 405. The I/O controller 415 may also manage peripherals not integrated into the electronic device 405. In some cases, the I/O controller 415 may represent a physical connection or port to an external peripheral. In some cases, the I/O controller 415 may utilize an operating system such as iOS®, ANDROID®, MS-DOS®, MS-WINDOWS®, OS/2®, UNIX®, LINUX®, or another known operating system. In other cases, the I/O controller 415 may represent or interact with a modem, a keyboard, a mouse, a touchscreen, or a similar device. In some cases, the I/O controller 415 may be implemented as part of a processor. In some cases, a user may interact with the electronic device 405 via the I/O controller 415 or via hardware components controlled by the I/O controller 415. In some examples, the I/O controller 415 may include a virtual assistant application of the electronic device 405 that may implement one or more of the techniques of the present disclosure.

The transceiver 420 may communicate bi-directionally, via one or more antennas, wired, or wireless links as described herein. For example, the transceiver 420 may represent a wired or wireless transceiver and may communicate bi-directionally with another wired or wireless transceiver. In some cases, the device may include a communication port 425. The communication port 425 may support wired and wireless access technologies, including 5G, 4G, 3G, 2G, Wi-Fi, Bluetooth, or Ethernet, among other examples. As such, in some aspects, the communication port 425 may be an example of a port supporting wired communications. In some other aspects, the communication port 425 may include a single antenna or more than one antenna, which may be capable of concurrently transmitting or receiving multiple wireless transmissions.

The memory 430 may include random-access memory (RAM) and read-only memory (ROM). The memory 430 may store computer-readable, computer-executable code 435 including instructions that, when executed, cause the processor to perform various functions described herein. In some cases, the memory 430 may contain, among other things, a basic I/O system (BIOS) which may control basic hardware or software operation such as the interaction with peripheral components or devices. In some examples, the memory 430 may include local memory, such as L2 cache or TCM. Additionally or alternatively, the memory 430 may include DDR or DRAM. In some implementations, the electronic device 405 may use the memory 430 to store audio data in one or more buffers that may include a keyword and a command that the processor 440 may process.

The processor 440 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 440 may be configured to operate a memory array using a memory controller. In other cases, a memory controller may be integrated into the processor 440. The processor 440 may be configured to execute computer-readable instructions stored in a memory (e.g., the memory 430) to cause the electronic device 405 to perform various functions (e.g., functions or tasks supporting systems and techniques for processing keywords in audio data). In some implementations, the processor 440 may detect a keyword and a command in the audio data stored in the memory 430 and may perform one or more operations or functions associated with executing the command.

The code 435 may include instructions to implement aspects of the present disclosure, including instructions to support audio processing. The code 435 may be stored in a non-transitory computer-readable medium such as system memory or other type of memory. In some cases, the code 435 may not be directly executable by the processor 440 but may cause a computer (e.g., when compiled and executed) to perform functions described herein.

The audio processing component 450 may include a first buffer 455 and a second buffer 460. As described in detail with reference to both FIGS. 3A and 3B, the audio processing component 450 may receive audio data from a user (e.g., via microphone 475) and may store a first portion of the audio data (e.g., an oldest or longest-stored portion of the audio data) in the first buffer 455 and may store a second portion of the audio data (e.g., a most recently received portion of the audio data) in the second buffer 460. In some examples, the electronic device 405 may support a command-first, keyword-second implementation associated with a virtual assistant configured on the electronic device 405. Accordingly, the audio processing component may attempt to detect a keyword associated with a command for the virtual assistant in the second buffer and may determine the presence of the command in the first buffer 455 if a keyword is detected in the second buffer 460.

The audio processing component 450 may also include a compression component 465 and a decompression component 470 that may support memory-saving techniques associated with command-first, keyword-second voice activation structures. In some examples, the compression component 465 may be coupled or in electronic communication with the first buffer 455 and may be configured to compress the first portion of the audio data stored in the first buffer 455. As such, the first buffer 455 may store compressed audio data (e.g., or a compressed copy of the first portion of the audio data). In some cases, the audio processing component 450, or the keyword manager 410, may detect a keyword in the second buffer 460. In such cases, the decompression component 470, which may be coupled or in electronic communication with the first buffer 455, may decompress the compressed audio data stored in the first buffer 455. In this manner, the audio processing component may pass decompressed audio data (e.g., the audio stored in the first buffer 455) and uncompressed audio data (e.g., the audio data stored in the second buffer 460) to the processor 440. In some implementations, the processor 440 may be unaware of the compression and decompression and may process the audio data as raw, uncompressed audio data.

Figure 5:
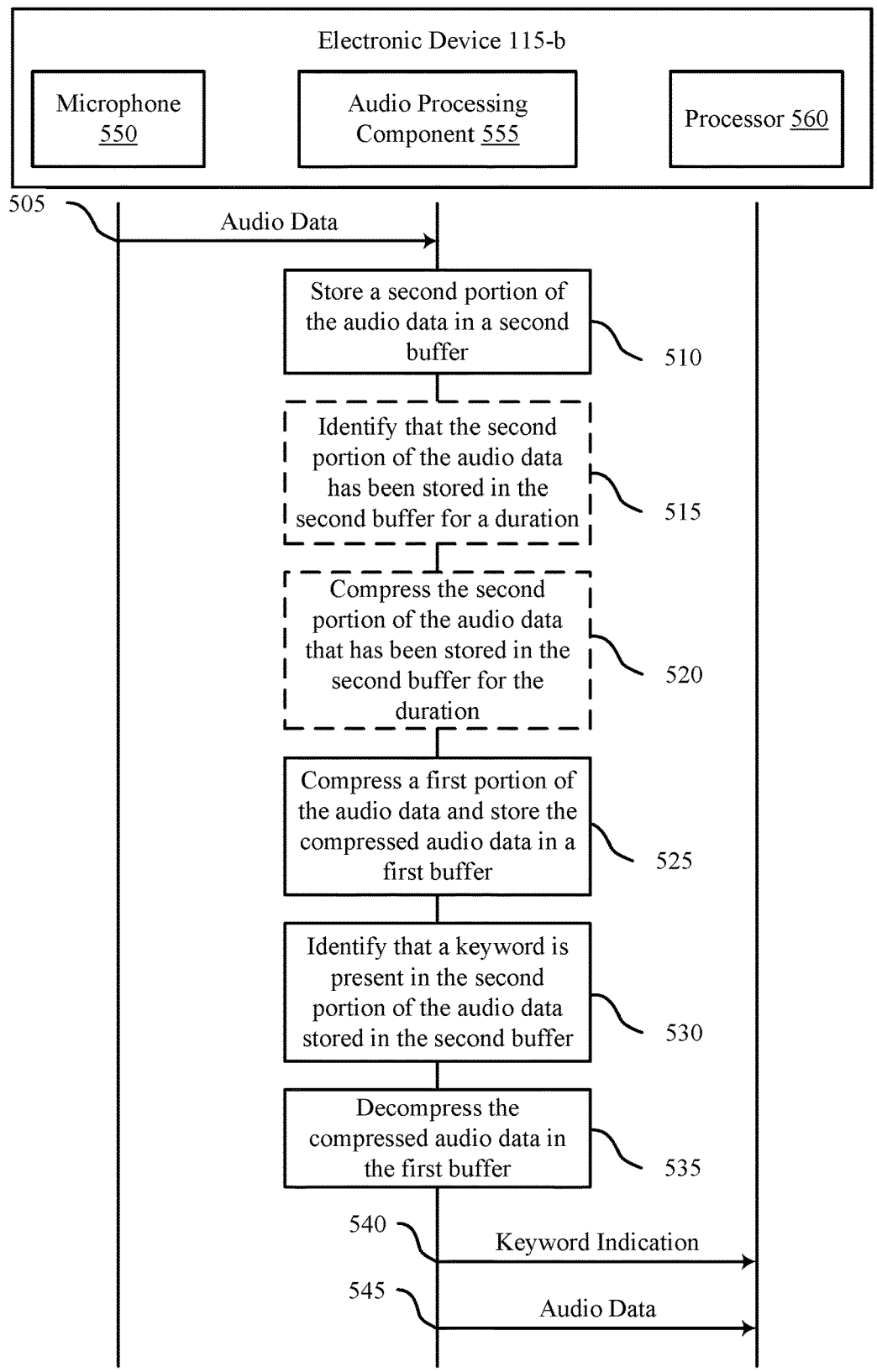
FIG. 5 illustrates an example of a process flow that supports systems and techniques for processing keywords in audio data in accordance with aspects of the present disclosure.

FIG. 5 illustrates an example of a process flow 500 that supports systems and techniques for processing keywords in audio data in accordance with aspects of the present disclosure. In some examples, the process flow 500 may implement aspects of communications system 100. The process flow 500 may include an electronic device 115-b, a microphone 550, an audio processing component 555, and a processor 560, which may be examples of the corresponding devices or components described with reference to FIGS. 1 through 4 and may implement one or more techniques for high-performing and cost-efficient command-first, keyword-second voice activation implementations associated with a virtual assistant. In some examples, the audio processing component 555 and the processor 560 may be components of the electronic device 115-b. In some examples, the microphone 550 may be separate from the electronic device 115-b and in some other examples the microphone 550 may also be a component of the electronic device 115-b. Alternative examples of the following may be implemented, where some steps are performed in a different order than described or are not performed at all. In some cases, steps may include additional features not mentioned below, or further steps may be added.

At 505, the microphone 550 may send (e.g., pass, provide, or otherwise communicate via a wired or wireless connection) audio data. Accordingly, the electronic device 115-b may receive, via the microphone, the audio data. In some examples the audio data may be a continuous stream of audio data received by the microphone from a number of users or other devices capable of generating audio data. In some aspects, the microphone may detect the sound waves (e.g., the longitudinal mechanical waves) associated with the audio data and translate analog wave information associated with the sound waves into the more readily usable audio data. In some specific examples, the audio data may include speech or voice signals from a user associated with a virtual assistant interface with the electronic device 115-b. For example, the audio data may include a command for the electronic device to execute and a keyword to trigger the electronic device to perform one or more audio processing operations associated with identifying or obtaining the command.

At 510, the audio processing component 555 of the electronic device 115-b store the audio data received from the microphone. In some examples, the audio processing component 555 may store portions of the audio data in one or more buffers. In some specific examples, the audio processing component may initially store a second portion of the audio data in a second buffer. In some cases, the second portion of the audio data may correspond to a most recently received portion of the audio data and the second buffer may be an example of a keyword buffer 315, as described in more detail with reference to FIG. 3B. In some implementations, the audio processing component 555 may attempt to detect a keyword in the second portion of the audio data that is stored in the second buffer and, accordingly, the second portion of the audio data stored in the second buffer may be uncompressed.

The audio processing component 555 may configure the second buffer to store audio data that was received within a threshold time duration. In some examples, the second buffer may be configured to store a second duration of the audio data (e.g., approximately the most recently received 2 seconds of audio data).

At 515, the audio processing component 555 may optionally identify that the second portion of the audio data has been stored in the second buffer for a duration that satisfies a threshold time duration. For example, the audio processing component 55 may identify that some of the audio data stored in the second buffer has been stored in the second buffer for longer than a threshold duration (e.g., longer than the second duration which the second buffer is configured to store, or approximately 2 seconds).

At 520, the audio processing component 555 may optionally compress the second portion of the audio data that has been stored in the second buffer for the duration that satisfies the threshold time duration. For example, based on the second portion of the audio data being stored in the second buffer for longer than the threshold time duration (e.g., longer than the duration that the second buffer is configured to store), the audio processing component 555 may determine that a keyword is not included in the second portion of the audio data and may determine that the second portion potentially includes a command. The audio processing component 555 may compress the second portion of the audio data that was stored in the second buffer for the threshold duration to save memory, because audio data that the audio processing component 555 determines to not include the keyword may be compressed without impacting the performance associated with keyword detection.

At 525, the audio processing component 555 may compress a first portion of the audio data into compressed audio data and may store the compressed audio data in a first buffer configured to store the compressed audio data. In some examples, the first portion of the audio data may correspond to an initially received portion of the audio data or a longest-stored portion of the audio data. In some implementations, the audio processing component 555 may determine that the first portion of the audio data does not include a keyword and may determine that the first portion of the audio data may store a command instead. Accordingly, the audio processing component 555 may store the first portion of the audio data in the first buffer.

In some implementations, compressing the first portion of the audio data may include compressing the second portion of the audio data that has been stored in the second buffer for the threshold duration, where the audio processing component 555 may store the second portion of the audio data in the second buffer before compressing the first portion of the audio data. In some specific embodiments, the audio processing component 555 may compress the second portion of the audio data that has been stored in the second buffer for the threshold duration in the second buffer. For example, in some embodiments, the second buffer may be configured to store both uncompressed and compressed audio data. In such examples, the audio processing component 555 may transfer the compressed audio data from the second buffer to the first buffer. Additionally or alternatively, the audio processing component 555 may store the compressed audio data in the second buffer in addition to the uncompressed audio data. For instance, the audio processing component may configure a single buffer (e.g., the second buffer) to store the compressed audio data and the uncompressed audio data. As such, the audio processing component 555 may use a single buffer to implement the techniques described herein.

In some other examples, the audio processing component may compress the second portion of the audio data that has been stored in the second buffer for the threshold duration after evicting the second portion from the second buffer. For example, the first and second buffers may be rolling buffers or cascaded buffers, where audio data may pass from the second buffer to the first buffer based on how long the audio data has been stored in the electronic device 115-b, and the audio processing component 555 may compress the audio data as it passes between the first and second buffers. In some other examples, the audio processing component 555 may compress the second portion of the audio data that has been stored in the second buffer for the threshold duration in the first buffer (e.g., after the second portion of the audio data has been passed to the first buffer).

In some other implementations, the audio processing component 555 may store the second portion of the audio data in the second buffer concurrently (e.g., simultaneously or at the same time) with storing the compressed audio data in the first buffer. In such implementations, the first buffer and the second buffer may include overlapping portions of the audio data.

At 530, the audio processing component 555 may identify that a keyword is present in the second portion of the audio data stored in the second buffer. In some examples, the audio processing component 555 may continuously or repeatedly attempt to identify the keyword in the second portion of the audio data stored in the second buffer. For example, the audio processing component 555 may continuously or repeatedly attempt to identify the keyword in the second portion of the audio data stored in the second buffer such that the audio processing component 555 attempts to identify the keyword each time new audio data is received (e.g., and is stored in the second buffer) and old audio data (e.g., audio data that has been stored in the second buffer for the threshold duration) is removed from the second buffer. In some other examples, the audio processing component 555 may attempt to identify the keyword at regular, discrete time intervals.

In some implementations, the audio processing component 555 may identify the keyword based on a keyword model configured for the electronic device 115-*b* (or for the virtual assistant configured for the electronic device 115-*b*), as described in more detail with reference to both FIGS. 3A and 3B.

In some examples, the audio processing component 555 may identify the keyword in the second portion of the audio data stored in the second buffer and may output or capture (or stop updating) the first portion of the audio data stored in the first buffer when the keyword is identified. For example, the audio processing component 555 may support command-first, keyword-second implementations for voice activation and, upon identification of the keyword, may expect that the command associated with the keyword was received prior to the keyword and may be included in the first portion of the audio data stored in the first buffer.

At 535, the audio processing component 555 may decompress the compressed audio data stored in the first buffer into decompressed audio data based on identifying that the keyword is present in the second portion of the audio data stored in the second buffer. In some examples, the audio processing component 555 may decompress the compressed audio data stored in the first buffer to enable a processor 560 to identify the command.

At 540, the audio processing component 555 may send, to the processor 560, an indication that the keyword is present in the audio data.

At 545, the audio processing component 555 may transmit the decompressed audio data and the second portion of the audio data that is uncompressed to the processor 560. In some implementations, the audio processing component 555 may align the decompressed audio data with the uncompressed audio data in time prior to transmitting the audio data to the processor 560. For example, based on aligning the decompressed audio data with the uncompressed audio, the processor 560 may be unaware that compression was used because the aligned audio data may appear like uncompressed audio data.

The processor 560 may be configured to identify the command associated with the keyword using the decompressed audio data. In some examples, the processor 560 may identify the command and perform one or more operations or functions associated with executing the command.

Figure 6A:
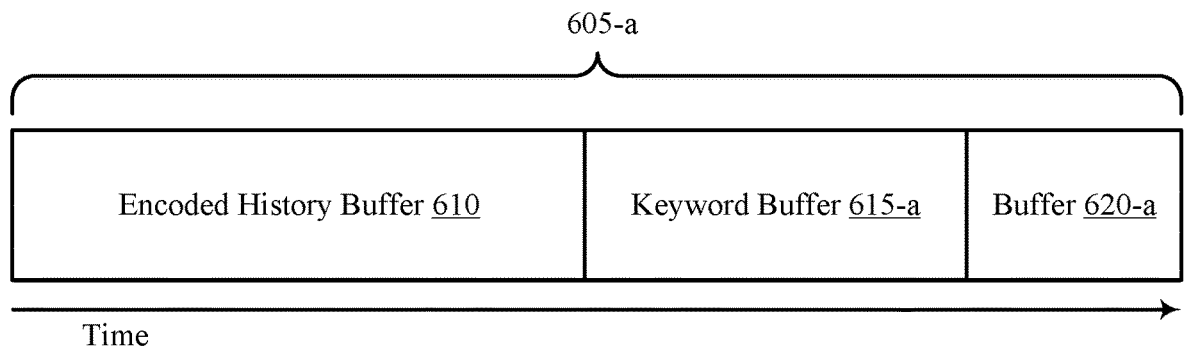
FIGS. 6A and 6B illustrate examples of buffer configurations that support systems and techniques for processing keywords in audio data in accordance with aspects of the present disclosure.
Figure 6B:
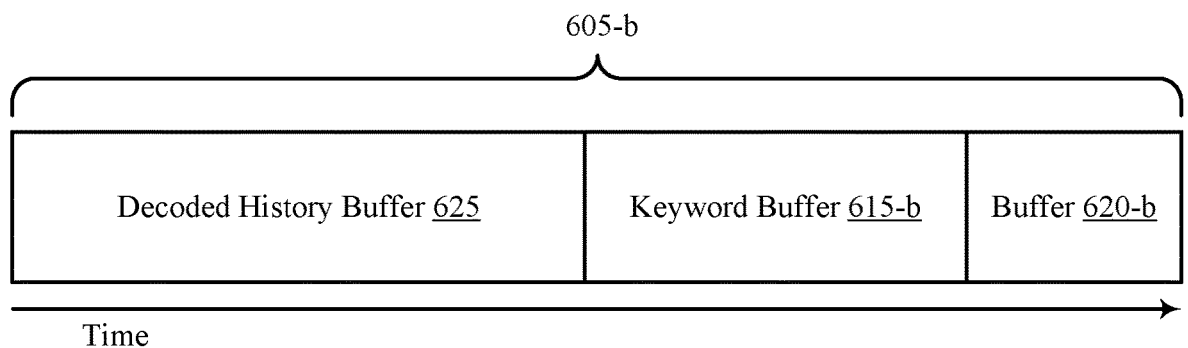

FIGS. 6A and 6B illustrate an example of buffer configurations 600 and 601 that support systems and techniques for processing keywords in audio data in accordance with aspects of the present disclosure. In some examples, the buffer configurations 600 and 601 may implement aspects of communications system 100. The buffer configurations 600 and 601 may illustrate example implementations for efficiently storing audio data in command-first, keyword-second voice activation procedures. For example, an electronic device, such as an electronic device 115 as described with reference to FIG. 1, may use buffer configuration 600 or 601, or both, to store audio data including a command and audio data including a keyword, where the audio data including the command may be received prior to receiving the audio data including the keyword.

The buffer configuration 600 may illustrate a command-first compression scheme. The buffer configuration 600 may include an encoded history buffer 610, a keyword buffer 615-*a*, and a buffer 620-*a* that may store audio data 605-*a*. The encoded history buffer 610 may include approximately 8-10 seconds of audio data and may be a second buffer storing a second portion of the audio data. The keyword buffer 615-*a* may include approximately 2 seconds of audio data and may be a first buffer storing a first portion of the audio data. The buffer 620-*a* may be a post-keyword buffer and may include approximately 300 ms of audio data. The buffer 620-*a* may be used as a time buffer to provide enough time for one or more processing units to turn on or wake up upon the detection of a keyword in the keyword buffer 615-*a*.

In some implementations, the electronic device may encode and compress the history buffer 310-*a*, as described with reference to FIG. 3B, to generate the encoded history buffer 610. In some specific implementations, the encoded history buffer 610 may reduce the memory usage associated with a history buffer storing a command from 320 KB to 86 KB and may reduce the memory usage associated with all of the audio data 605-*a* to 160 KB, which, in some cases, may save 274 KB of memory. In some examples, the audio processing component may use a G.722 or an adaptive differential pulse-code modulation (ADPCM) compression scheme to reduce the memory usage associated with storing the encoded history buffer 610 (e.g., may compress 10 seconds of raw audio data associated with 320 KB to 10 seconds of compressed audio data associated with 86 KB).

Upon detection of the keyword in the keyword buffer 615-*a*, the audio processing component may decompress the encoded history buffer 610 and may transmit the decompressed encoded history buffer 610 (i.e., the decoded history buffer 625) to a processor of the electronic device. Prior to transmitting the decoded history buffer 625, the audio processing component may align the decoded history buffer 625 with the keyword buffer 615-*b* and the buffer 620-*b* such that there are no time gaps between the buffers. In some examples, the keyword buffer 615-*b* and the buffer 620-*b* may be the same as the keyword buffer 615-*a* and the buffer 620-*a*, respectively.

The processor may receive the buffer configuration 601 from the audio processing component. The buffer configuration 601 may include the decoded history buffer 625, the keyword buffer 615-*b*, and the buffer 620-*b* that may store audio data 605-*b*. The decoded history buffer 625 may be a decoded and decompressed version (e.g., a raw data version) of the encoded history buffer 610. The processor may be unaware that compression was used by the audio processing component and may identify the command in the decoded history buffer 625 associated with the keyword identified in the keyword buffer 615-*a*. In some examples, the processor may also identify the keyword in the keyword buffer 615-*b* to check if the audio processing component correctly identified that the keyword is present. For example, the processor may be configured with higher accuracy detection models than the audio processing component and may more accurately identify if the keyword is present.

Figure 7:
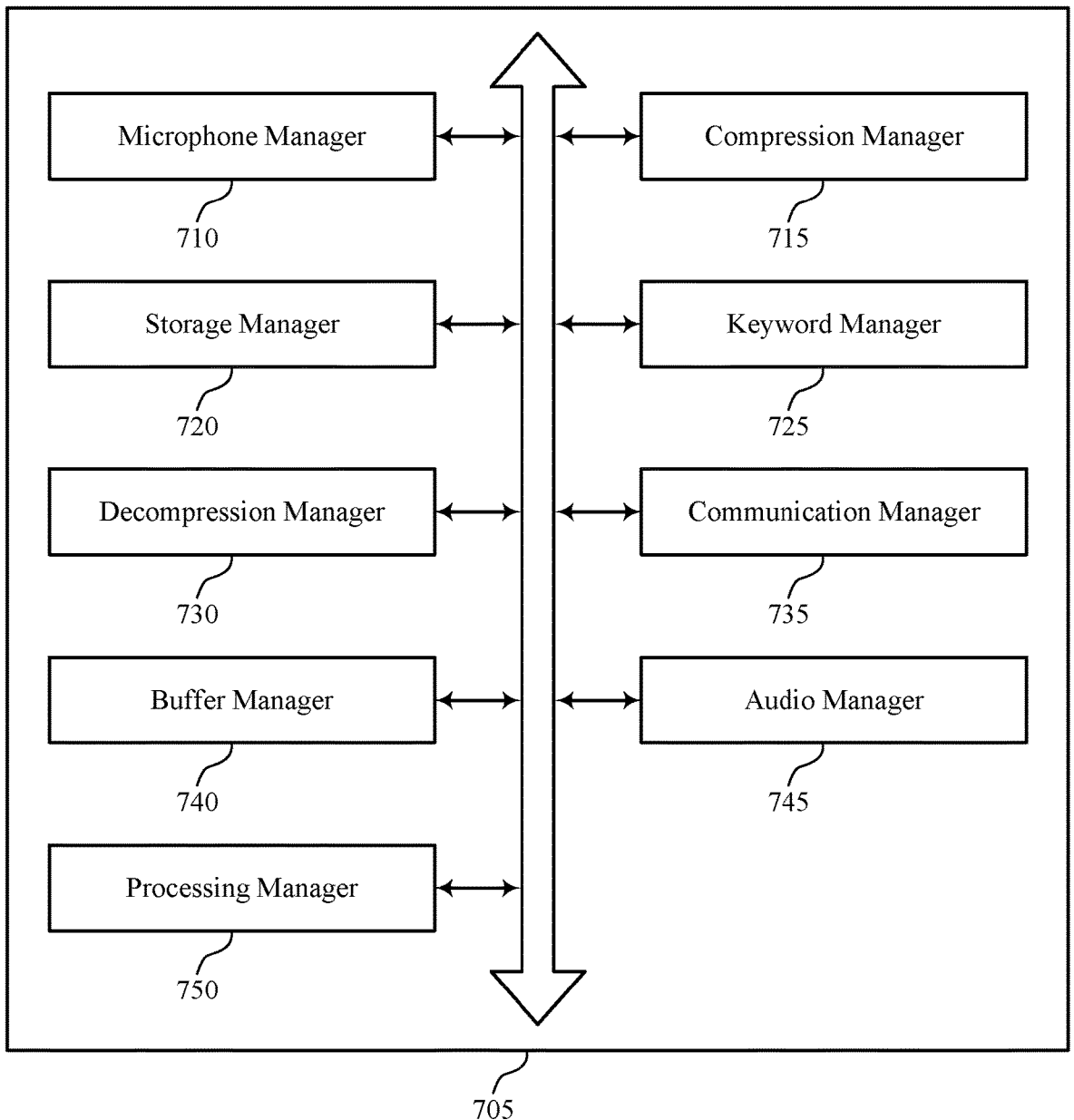
FIG. 7 illustrates a block diagram of an audio processing component that supports systems and techniques for processing keywords in audio data in accordance with aspects of the present disclosure.

FIG. 7 shows a block diagram 700 of an electronic device 705 that supports systems and techniques for processing keywords in audio data in accordance with aspects of the present disclosure. The electronic device 705 may include aspects of an audio processing component (e.g., audio processing component 450) as described herein. The electronic device 705 may include a microphone manager 710, a compression manager 715, a storage manager 720, a keyword manager 725, a decompression manager 730, a communication manager 735, a buffer manager 740, an audio manager 745, and a processing manager 750. Each of these modules may communicate, directly or indirectly, with one another (e.g., via one or more buses).

The microphone manager 710 may receive, via a microphone, audio data.

The compression manager 715 may compress a first portion of the audio data into compressed audio data.

The storage manager 720 may store the compressed audio data in a first buffer configured to store the compressed audio data. In some examples, the storage manager 720 may store a second portion of the audio data that is uncompressed audio data in a second buffer. In some examples, the storage manager 720 may store the second portion of the audio data in the second buffer concurrently with storing the compressed audio data in the first buffer based on receiving the audio data, the second buffer configured to store the uncompressed audio data.

In some examples, retrieving the second portion of the audio data from the second buffer based on identifying that the keyword is present, where sending the decompressed audio data further includes sending the second portion of the audio data retrieved from the second buffer. In some examples, the storage manager 720 may store the second portion of the audio data in the second buffer before compressing the first portion of the audio data, where the second buffer is configured to store the uncompressed audio data.

In some examples, identifying that the second portion of the audio data has been stored in the second buffer for a first duration that satisfies a threshold, where compressing the first portion of the audio data further includes compressing the second portion of the audio data that has been stored in the second buffer for the first duration that satisfies the threshold. In some examples, the storage manager 720 may retrieve the second portion of the audio data from the second buffer.

In some examples, the storage manager 720 may retrieve the compressed audio data from the first buffer, where decompressing the compressed audio data is based on retrieving the compressed audio data from the first buffer, where transmitting the decompressed audio data and the second portion of the audio data is based on retrieving the second portion of the audio data and the compressed audio data. In some examples, the storage manager 720 may identify that a third portion of the compressed audio data has been stored in the first buffer for a first duration that satisfies a threshold. In some examples, the storage manager 720 may evict the third portion of the compressed audio data from the first buffer based on identifying that the third portion has been stored for the first duration that satisfies the threshold.

The keyword manager 725 may identify that a keyword is present in the second portion of the audio data stored in the second buffer.

The decompression manager 730 may decompress the compressed audio data stored in the first buffer into decompressed audio data based on identifying that the keyword is present.

The communication manager 735 may transmit the decompressed audio data and the second portion of the audio data that is uncompressed to a processor. In some examples, the communication manager 735 may send, to the processor, an indication that the keyword is present in the audio data, where the processor is configured to identify an audio command associated with the keyword using the decompressed audio data.

The buffer manager 740 may manage the buffers used to store the audio data (e.g., the first and second buffers used to store the compressed or uncompressed portions of the audio data). In some cases, the first buffer stores a first copy of the audio data that is compressed into the compressed audio data. In some cases, the second buffer stores a second copy of the audio data that is uncompressed.

In some cases, the first buffer is configured to store a first duration of the compressed audio data. In some cases, the second buffer is configured to store a second duration of the audio data that is uncompressed, the second duration being less than the first duration. In some cases, the first buffer includes a circular buffer having a fixed size and configured to store a continuous data stream.

The audio manager 745 may align the decompressed audio data stored in the first buffer with the second portion of the audio data stored in the second buffer, where transmitting the decompressed audio data and the second portion of the audio data is based on aligning the decompressed audio data with the second portion of the audio data used to determine whether the keyword is present.

The processing manager 750 may process the second portion of the audio data that is uncompressed based on storing the compressed audio data in the first buffer, where identifying the keyword is based on processing the second portion of the audio data that is uncompressed.

Figure 8:
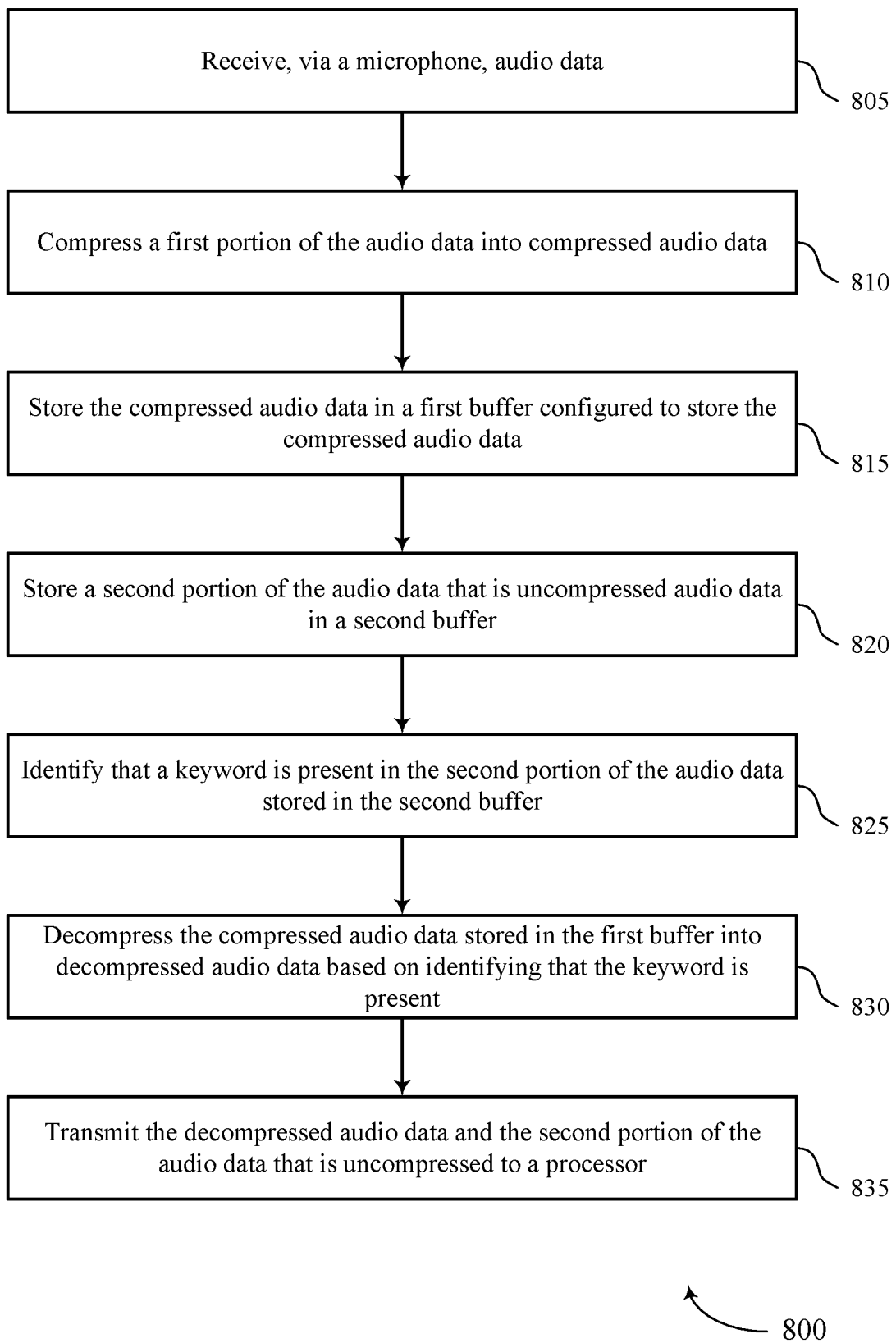
FIGS. 8 and 9 illustrate flowcharts illustrating methods that support systems and techniques for processing keywords in audio data in accordance with aspects of the present disclosure.

FIG. 8 shows a flowchart illustrating a method 800 that supports systems and techniques for processing keywords in audio data in accordance with aspects of the present disclosure. The operations of method 800 may be implemented by an electronic device or its components as described herein. For example, the operations of method 800 may be performed by an electronic device as described with reference to FIGS. 4 and 7. In some examples, an electronic device may execute a set of instructions to control the functional elements of the electronic device to perform the functions described herein. Additionally or alternatively, a default may perform aspects of the functions described herein using special-purpose hardware (e.g., an audio processing component, among other components).

At 805, the electronic device may receive, via a microphone, audio data. The operations of 805 may be performed according to the methods described herein. In some examples, aspects of the operations of 805 may be performed by a microphone manager as described with reference to FIG. 7.

At 810, the electronic device may compress a first portion of the audio data into compressed audio data. The operations of 810 may be performed according to the methods described herein. In some examples, aspects of the operations of 810 may be performed by a compression manager as described with reference to FIG. 7.

At 815, the electronic device may store the compressed audio data in a first buffer configured to store the compressed audio data. The operations of 815 may be performed according to the methods described herein. In some examples, aspects of the operations of 815 may be performed by a storage manager as described with reference to FIG. 7.

At 820, the electronic device may store a second portion of the audio data that is uncompressed audio data in a second buffer. The operations of 820 may be performed according to the methods described herein. In some examples, aspects of the operations of 820 may be performed by a storage manager as described with reference to FIG. 7.

At 825, the electronic device may identify that a keyword is present in the second portion of the audio data stored in the second buffer. The operations of 825 may be performed according to the methods described herein. In some examples, aspects of the operations of 825 may be performed by a keyword manager as described with reference to FIG. 7.

At 830, the electronic device may decompress the compressed audio data stored in the first buffer into decompressed audio data based on identifying that the keyword is present. The operations of 830 may be performed according to the methods described herein. In some examples, aspects of the operations of 830 may be performed by a decompression manager as described with reference to FIG. 7.

At 835, the electronic device may transmit the decompressed audio data and the second portion of the audio data that is uncompressed to a processor. The operations of 835 may be performed according to the methods described herein. In some examples, aspects of the operations of 835 may be performed by a communication manager as described with reference to FIG. 7.

Figure 9:
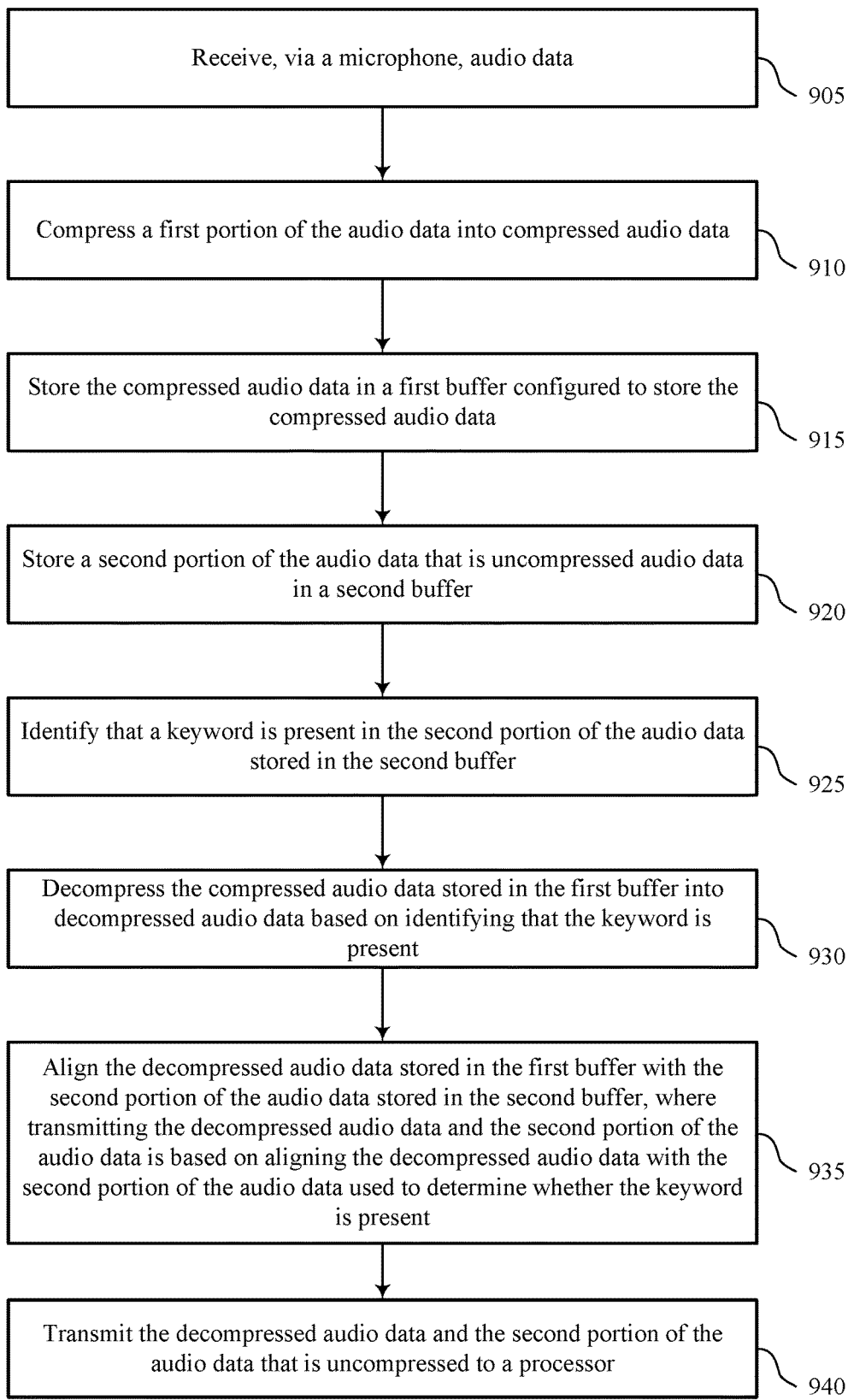

FIG. 9 shows a flowchart illustrating a method 900 that supports systems and techniques for processing keywords in audio data in accordance with aspects of the present disclosure. The operations of method 900 may be implemented by an electronic device or its components as described herein. For example, the operations of method 900 may be performed by an electronic device as described with reference to FIGS. 4 and 7. In some examples, an electronic device may execute a set of instructions to control the functional elements of the default to perform the functions described herein. Additionally or alternatively, a default may perform aspects of the functions described herein using special-purpose hardware (e.g., an audio processing component, among other components).

At 905, the electronic device may receive, via a microphone, audio data. The operations of 905 may be performed according to the methods described herein. In some examples, aspects of the operations of 905 may be performed by a microphone manager as described with reference to FIG. 7.

At 910, the electronic device may compress a first portion of the audio data into compressed audio data. The operations of 910 may be performed according to the methods described herein. In some examples, aspects of the operations of 910 may be performed by a compression manager as described with reference to FIG. 7.

At 915, the electronic device may store the compressed audio data in a first buffer configured to store the compressed audio data. The operations of 915 may be performed according to the methods described herein. In some examples, aspects of the operations of 915 may be performed by a storage manager as described with reference to FIG. 7.

At 920, the electronic device may store a second portion of the audio data that is uncompressed audio data in a second buffer. The operations of 920 may be performed according to the methods described herein. In some examples, aspects of the operations of 920 may be performed by a storage manager as described with reference to FIG. 7.

At 925, the electronic device may identify that a keyword is present in the second portion of the audio data stored in the second buffer. The operations of 925 may be performed according to the methods described herein. In some examples, aspects of the operations of 925 may be performed by a keyword manager as described with reference to FIG. 7.

At 930, the electronic device may decompress the compressed audio data stored in the first buffer into decompressed audio data based on identifying that the keyword is present. The operations of 930 may be performed according to the methods described herein. In some examples, aspects of the operations of 930 may be performed by a decompression manager as described with reference to FIG. 7.

At 935, the electronic device may align the decompressed audio data stored in the first buffer with the second portion of the audio data stored in the second buffer, where transmitting the decompressed audio data and the second portion of the audio data is based on aligning the decompressed audio data with the second portion of the audio data used to determine whether the keyword is present. The operations of 935 may be performed according to the methods described herein. In some examples, aspects of the operations of 935 may be performed by an audio manager as described with reference to FIG. 7.

At 940, the electronic device may transmit the decompressed audio data and the second portion of the audio data that is uncompressed to a processor. The operations of 940 may be performed according to the methods described herein. In some examples, aspects of the operations of 940 may be performed by a communication manager as described with reference to FIG. 7.

It should be noted that the methods described herein describe possible implementations, and that the operations and the steps may be rearranged or otherwise modified and that other implementations are possible. Further, aspects from two or more of the methods may be combined.

Although aspects of a long term evolution (LTE), LTE-Advanced (LTE-A), LTE-A Pro, or New Radio (NR) system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-orthogonal frequency division multiplexing (OFDM), as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for audio processing at a device, comprising:
receiving, via a microphone, audio data;
compressing a first portion of the audio data into compressed audio data;
storing the compressed audio data in a first buffer configured to store the compressed audio data;
storing a second portion of the audio data that is uncompressed audio data in a second buffer;
identifying that a keyword is present in the second portion of the audio data stored in the second buffer;
decompressing the compressed audio data stored in the first buffer into decompressed audio data based at least in part on identifying that the keyword is present; and
transmitting the decompressed audio data and the second portion of the audio data that is uncompressed to a processor.

2. The method of claim 1, wherein storing the second portion of the audio data in the second buffer further comprises:
storing the second portion of the audio data in the second buffer concurrently with storing the compressed audio data in the first buffer based at least in part on receiving the audio data, the second buffer configured to store the uncompressed audio data.

3. The method of claim 2, wherein:
the first buffer stores a first copy of the audio data that is compressed into the compressed audio data; and
the second buffer stores a second copy of the audio data that is uncompressed.

4. The method of claim 2, wherein:
the first buffer is configured to store a first duration of the compressed audio data; and
the second buffer is configured to store a second duration of the audio data that is uncompressed, the second duration being less than the first duration.

5. The method of claim 2, further comprising:
retrieving the second portion of the audio data from the second buffer based at least in part on identifying that the keyword is present, wherein sending the decompressed audio data further comprises sending the second portion of the audio data retrieved from the second buffer.

6. The method of claim 1, wherein storing the second portion of the audio data in the second buffer further comprises:
storing the second portion of the audio data in the second buffer before compressing the first portion of the audio data, wherein the second buffer is configured to store the uncompressed audio data.

7. The method of claim 6, further comprising:
identifying that the second portion of the audio data has been stored in the second buffer for a first duration that satisfies a threshold, wherein compressing the first portion of the audio data further comprises compressing the second portion of the audio data that has been stored in the second buffer for the first duration that satisfies the threshold.

8. The method of claim 6, further comprising:
retrieving the second portion of the audio data from the second buffer; and
retrieving the compressed audio data from the first buffer, wherein decompressing the compressed audio data is based at least in part on retrieving the compressed audio data from the first buffer, wherein transmitting the decompressed audio data and the second portion of the audio data is based at least in part on retrieving the second portion of the audio data and the compressed audio data.

9. The method of claim 1, further comprising:
sending, to the processor, an indication that the keyword is present in the audio data, wherein the processor is configured to identify an audio command associated with the keyword using the decompressed audio data.

10. The method of claim 1, further comprising:
aligning the decompressed audio data stored in the first buffer with the second portion of the audio data stored in the second buffer, wherein transmitting the decompressed audio data and the second portion of the audio data is based at least in part on aligning the decompressed audio data with the second portion of the audio data used to determine whether the keyword is present.

11. The method of claim 1, further comprising:
identifying that a third portion of the compressed audio data has been stored in the first buffer for a first duration that satisfies a threshold; and
evicting the third portion of the compressed audio data from the first buffer based at least in part on identifying that the third portion has been stored for the first duration that satisfies the threshold.

12. The method of claim 1, further comprising:
processing the second portion of the audio data that is uncompressed based at least in part on storing the compressed audio data in the first buffer, wherein identifying the keyword is based at least in part on processing the second portion of the audio data that is uncompressed.

13. The method of claim 1, wherein the first buffer comprises a circular buffer having a fixed size and configured to store a continuous data stream.

14. An apparatus, comprising:
a processor;
a microphone configured to detect audio data;
an audio processing component coupled with the microphone and the processor, the audio processing component comprising;
a first buffer configured to store compressed audio data for a first duration;
a second buffer configured to store uncompressed audio data for a second duration, wherein the audio processing component is configured to identify whether a keyword is present in the audio data detected by the microphone using the uncompressed audio data stored in the second buffer; and
a decompression component coupled with the first buffer and configured to decompress the compressed audio data stored in the first buffer, wherein decompressing the compressed audio data stored in the first buffer is based at least in part on identifying that the keyword is present in the uncompressed audio data stored in the second buffer.

15. The apparatus of claim 14, further comprising:
a compression component coupled with the first buffer and configured to compress a first portion of the audio data, wherein the first buffer is configured to store the compressed audio data.

16. The apparatus of claim 14, wherein the audio processing component is configured to:
identify that a second portion of the audio data that comprises the uncompressed audio data is stored in the second buffer for the second duration; and
compress the second portion of the audio data that has been stored in the second buffer for the second duration to generate the compressed audio data.

17. The apparatus of claim 16, wherein the audio processing component is configured to store a first portion of the audio data that was compressed into the first buffer based at least in part on identifying that the second portion of the audio data has been stored in the second buffer for the second duration.

18. The apparatus of claim 14, wherein the audio processing component is configured to:
identify that a first portion of the audio data that comprises the compressed audio data has been stored in the first buffer for the first duration; and
evict the first portion of the audio data from the first buffer based at least in part on identifying that the first portion of the audio data has been stored in the first buffer for the first duration.

19. The apparatus of claim 14, further comprising: a communication component configured to send the decompressed audio data 3 to the processor and the uncompressed audio data stored in the second buffer to the processor, wherein sending the decompressed audio data and the uncompressed audio data to the processor is based at least in part on the audio processing component identifying that the keyword is present in the uncompressed audio data stored in the second buffer.

20. The apparatus of claim 19, wherein the communication component is further configured to send an indication that the keyword is present in the uncompressed audio data sent to the processor.

21. The apparatus of claim 19, wherein the processor is configured to:
identify a command included in the decompressed audio data and associated with the keyword identified in the uncompressed audio data; and
execute the command based at least in part on identifying the command.

22. The apparatus of claim 14, wherein the first buffer is configured to store the compressed audio data and the second buffer is configured to store the uncompressed audio data concurrently.

23. The apparatus of claim 14, wherein the second duration that the second buffer stores the uncompressed audio data is shorter than the first duration that the first buffer stores the compressed audio data.

24. An apparatus for audio processing at a device, comprising:
a processor,
memory coupled with the processor; and
instructions stored in the memory and executable by the processor to cause the apparatus to:
receive, via a microphone, audio data;
compress a first portion of the audio data into compressed audio data;
store the compressed audio data in a first buffer configured to store the compressed audio data;

store a second portion of the audio data that is uncompressed audio data in a second buffer;

identify that a keyword is present in the second portion of the audio data stored in the second buffer;

decompress the compressed audio data stored in the first buffer into decompressed audio data based at least in part on identifying that the keyword is present; and transmit the decompressed audio data and the second portion of the audio data that is uncompressed to a processor.

25. The apparatus of claim 24, wherein the instructions to store the second portion of the audio data in the second buffer further are executable by the processor to cause the apparatus to:

store the second portion of the audio data in the second buffer concurrently with storing the compressed audio data in the first buffer based at least in part on receiving the audio data, the second buffer configured to store the uncompressed audio data.

26. The apparatus of claim 25, wherein:

the first buffer stores a first copy of the audio data that is compressed into the compressed audio data; and the second buffer stores a second copy of the audio data that is uncompressed.

27. The apparatus of claim 25, wherein:

the first buffer is configured to store a first duration of the compressed audio data; and the second buffer is configured to store a second duration of the audio data that is uncompressed, the second duration being less than the first duration.

28. The apparatus of claim 25, wherein the instructions are further executable by the processor to cause the apparatus to:

the instructions to retrieve the second portion of the audio data from the second buffer based at least in part on identifying that the keyword is present, wherein sending the decompressed audio data further are executable by the processor to cause the apparatus to send the second portion of the audio data retrieved from the second buffer.

29. An apparatus for audio processing at a device, comprising:

means for receiving, via a microphone, audio data;

means for compressing a first portion of the audio data into compressed audio data;

means for storing the compressed audio data in a first buffer configured to store the compressed audio data;

means for storing a second portion of the audio data that is uncompressed audio data in a second buffer;

means for identifying that a keyword is present in the second portion of the audio data stored in the second buffer;

means for decompressing the compressed audio data stored in the first buffer into decompressed audio data based at least in part on identifying that the keyword is present; and means for transmitting the decompressed audio data and the second portion of the audio data that is uncompressed to a processor.

* * * * *